(12) United States Patent
Goss et al.

(10) Patent No.: US 9,058,281 B2
(45) Date of Patent: Jun. 16, 2015

(54) ALLOCATING MEMORY USAGE BASED ON QUALITY METRICS

(75) Inventors: Ryan James Goss, Prior Lake, MN (US); David Scott Seekins, Shakopee, MN (US); Mark Allen Gaertner, Vadnais Heights, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 256 days.

(21) Appl. No.: 13/486,761

(22) Filed: Jun. 1, 2012

(65) Prior Publication Data

US 2013/0326116 A1 Dec. 5, 2013

(51) Int. Cl.
G06F 12/00 (2006.01)
G06F 12/08 (2006.01)

(52) U.S. Cl.
CPC ...... *G06F 12/0871* (2013.01); *G06F 2212/222* (2013.01); *G06F 2212/502* (2013.01); *G06F 2212/217* (2013.01)

(58) Field of Classification Search
CPC .......... G06F 12/00; G06F 12/08; G06F 12/16
USPC ........................ 711/103, 113, 170; 365/238.5
See application file for complete search history.

(56) References Cited

U.S. PATENT DOCUMENTS

| | | | |
|---|---|---|---|
| 7,058,764 B2 * | 6/2006 | Bearden ........................ | 711/129 |
| 7,525,870 B2 * | 4/2009 | Erez ............................ | 365/238.5 |
| 2002/0087758 A1 * | 7/2002 | Dixon ............................. | 710/56 |
| 2004/0017630 A1 * | 1/2004 | Akagi et al. ..................... | 360/69 |
| 2004/0103245 A1 * | 5/2004 | Fukusawa et al. ............. | 711/113 |
| 2004/0215875 A1 * | 10/2004 | Matsuba et al. ............... | 711/113 |
| 2006/0248387 A1 | 11/2006 | Nicholson et al. | |
| 2008/0082776 A1 * | 4/2008 | Spielberg et al. .............. | 711/170 |
| 2010/0246246 A1 * | 9/2010 | Kim et al. ...................... | 365/163 |
| 2012/0042182 A1 | 2/2012 | Fulkerson et al. | |
| 2012/0096225 A1 * | 4/2012 | Khawand et al. .............. | 711/119 |
| 2012/0144109 A1 * | 6/2012 | Balakrishnan et al. ....... | 711/113 |
| 2012/0290768 A1 * | 11/2012 | Rubowitz ....................... | 711/103 |
| 2013/0044542 A1 * | 2/2013 | Huang et al. .............. | 365/185.03 |

OTHER PUBLICATIONS

Oh et al., Caching less for better performance, Balancing cache size and update cost of flash memory cache in hybrid storage systems, Fast'12" Proceedings of the 10th USENIX conference on File and Storage Technoloiges, 2012.*

Lee et al., FlexFS: A Flexible Flash File System for MLC NAND Flash Memory, Proceedings of USENIX Technical Conference, 2009.*

Cai et al, Error Patterns in MLC Nand Flash Memory, Date '12 Proceedings of the conference on design, automation and test in Europe, pp. 521-526.*

(Continued)

*Primary Examiner* — Aimee Li
*Assistant Examiner* — Edmund Kwong
(74) *Attorney, Agent, or Firm* — Hollingsworth Davis, LLC

(57) ABSTRACT

A tiered memory system includes a memory controller for a primary memory and a secondary memory, where the secondary memory is used as a cache for the primary memory. The memory controller is configured to cause redundant data that is stored in the primary memory of the memory system to be stored in first memory locations of the secondary memory. The controller causes data that is not stored in the primary memory to be stored in second memory locations of the secondary memory. The second memory locations have at least one of lower bit error rate and higher access speed than the first memory locations.

19 Claims, 8 Drawing Sheets

(56) References Cited

OTHER PUBLICATIONS

Kgil et al., Improving Nand Flash Based Disk Caches, International Symposium on Computer Architecture, 2008, pp. 327-338.*

Bisson et al., NVCache: Increasing the effectiveness of disk spin-down algorithms with caching, Proceedings of the 14th IEEE International Symposium of Modeling, Analysis, and Simulation of Computer and Telecommunication Systems, 2006.*

Hong et al., NAND Flash-based Disk Cache Using SLC/MLC Combined Flash Memory, SNAPI 2010, pp. 21-30.*

Shim et al., An Adaptive Partitioning Scheme for DRAM-based Cache in Solid State Drives., MSST, 2010 IEEE 26th Symposium, pp. 1-12.*

Qureshi et al., Morphable Memory System: A Robust Architecture for Exploiting Multi-Level Phase Change Memories, ISCA '10, Jun. 19-23, 2010.*

* cited by examiner

ALLOCATING MEMORY USAGE BASED ON QUALITY METRICS

SUMMARY

A system includes a memory controller for a tiered memory that includes a primary memory and a secondary memory, wherein the secondary memory is used as a cache for the primary memory. The memory controller is configured to cause redundant data that is stored in other locations of the memory system, e.g. in the primary memory, to be stored in first memory locations of the secondary memory. The controller causes data that is not stored in other locations of the memory system to be stored in second memory locations of the secondary memory. The second memory locations have at least one of lower bit error rate and higher access speed than the first memory locations.

Some embodiments are directed to a method of operating a memory controller. The method includes causing redundant data that is also stored in a primary memory of a memory device to be stored in first memory locations of a secondary memory of the memory device, the secondary memory operating as a cache for the primary memory. Non-redundant data that is not stored in the primary memory of the memory device is stored in second memory locations of the secondary memory of the memory device. The second memory locations have at least one of a lower bit error rate and higher access speed than the first memory locations.

These and other features and aspects of the various embodiments disclosed herein can be understood in view of the following detailed discussion and the accompanying drawings.

DETAILED DESCRIPTION

Figure 1:
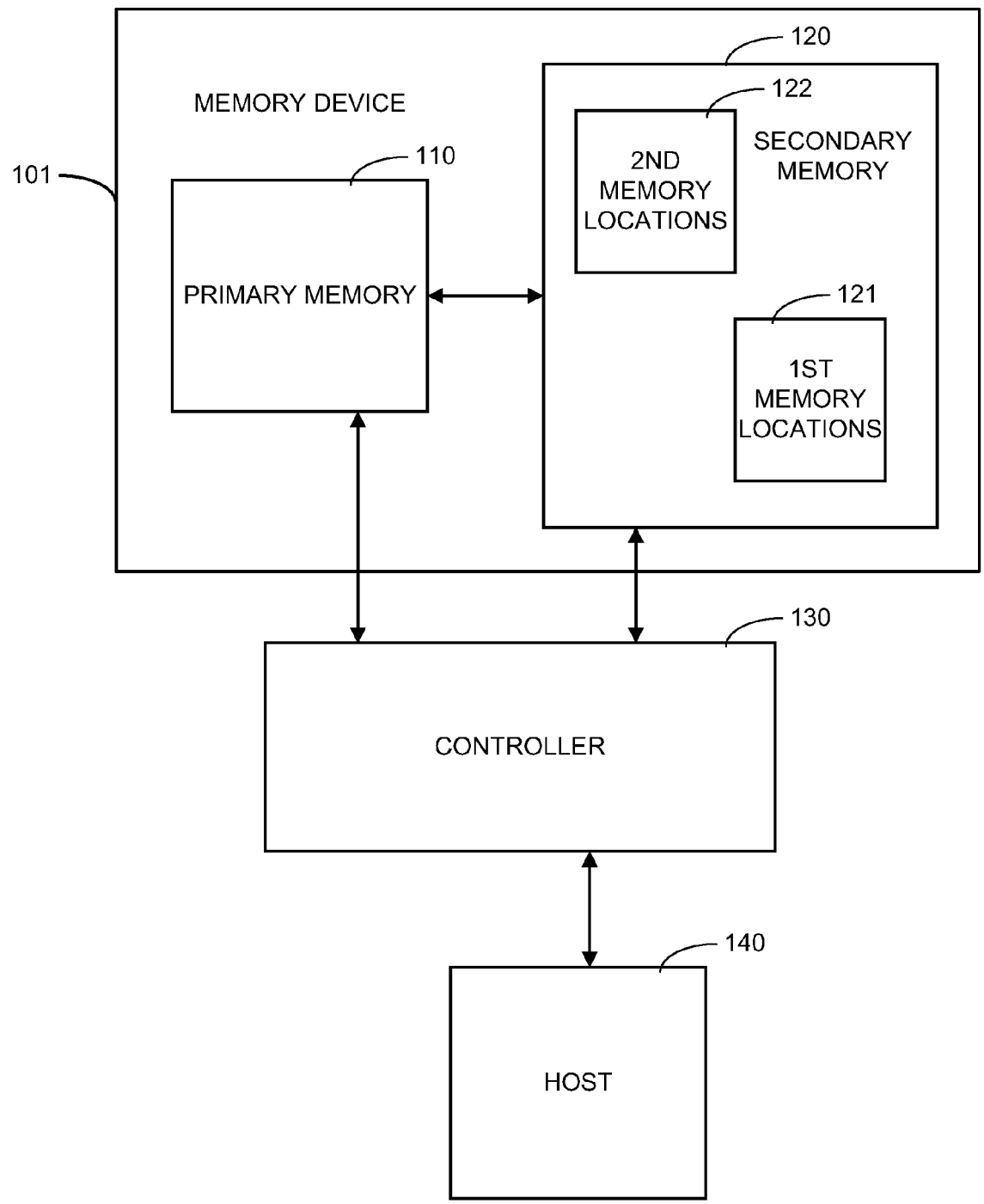
FIG. 1 is a block diagram of a system comprising a memory device that includes a primary memory and a secondary memory.

Some memory devices use at least two types of memory in a hybrid or tiered memory system, where one type of memory is used as a primary memory and another type of memory is used as a secondary memory. The primary memory may have greater storage capacity but slower access times than the secondary memory, for example. In such cases, the secondary memory may serve as a buffer for data accesses to and from the primary memory. In this arrangement, the secondary memory can serve as a read cache and/or a write cache for the primary memory. One example of such a memory device is a hybrid memory, in which the primary memory may comprise nonvolatile memory such as magnetic disk, magnetic tape, and/or optical disk and the secondary memory may also be nonvolatile memory such as solid state flash memory, and/or the secondary memory may be volatile memory with or without battery backup. Note that the terms "primary memory" and "secondary memory" are used herein to denote differences in memory (e.g., usage, capacity, performance, memory class or type, etc.) and not necessarily order or preference.

In one hybrid configuration, the primary memory is a hard disk drive (HDD) and the secondary memory is a solid state drive (SSD), e.g., an SSD comprising flash memory. Flash memory is based on floating gate transistor technology which allows an electrical charge to be retained on the floating gate of the transistor. The level of charge determines the logic value of the cell. In some arrangements, erasing a flash cell is a process that charges the floating gate, causing the flash memory cell to store a value of logic one. Programming a flash memory cell discharges the floating gate, bringing the logic value of the memory cell to zero. In this arrangement, it is possible to program (discharge) a cell that was previously erased (charged).

Flash memory is typically arranged in blocks of pages. An erase operation can act on an entire block, causing all bits of all the pages to be erased, e.g., charged to a logic value of 1. A program operation can be performed page by page.

The duration of time that a flash memory cell can reliably preserve data, e.g., with a bit error rate (BER) less than some minimum value, is referred to as the data retention time. Over time, charge leaks from the flash memory cells and this leakage can eventually cause data to be lost. If the specified data retention time is exceeded, the contents of the flash memory become unreliable.

Flash memory cells degrade as a function of the number of erase/program cycles experienced by the cells. As the memory cell experiences an increasing number of erase/program cycles, the data retention time decreases. Flash devices typically specify a maximum number of erase/program cycles for which cell performance will remain within acceptable tolerances. This maximum number of programming cycles is referred to as the endurance. A new flash device may have memory cells with a fairly narrow bit error rate (BER) distribution for a particular retention time. As the cells degrade, the bit error rate (BER) of the cells generally increases for a particular retention time and the distribution of BERs for a group of cells, e.g., a page or block of cells, widens. Even when wear leveling processes are employed, the reliability distribution, as reflected by the BER distribution, of the memory cells, may widen over time due to use and other factors.

A flash device may comprise single level memory cells (SLCs) that store one bit of data per cell, in which case the flash device is referred to as an SLC device. A flash device may comprise multilevel memory cells (MLCs) that store two or more bits of data per memory cell, in which case the flash device is referred to as an MLC device. In MLC memory devices, each flash memory cell stores a most significant bit (MSB), a least significant bit (LSB), and may store one or more bits having intermediate significance (ISBs).

The memory cells of the flash device are arranged in physical pages that share a word line which is activated to access the page of memory. The logical pages of the MLC device may be architecturally arranged in full sequence architecture or in multipage architecture. In full sequence architecture, a logical page of memory can include the MSB, LSB, and ISB of a particular cell. In multipage architecture, bits having the same level of significance are arranged in logical pages. In other words, for a physical page of 3-level memory cells, each cell having an MSB, an ISB, and the LSB, the MSBs are arranged in an MSB page, the ISBs are arranged in an ISB page, and the LSBs are arranged in an LSB page.

Some types of flash memory pages are inherently more reliable than other types of flash memory cells. For example due to the way in which charge stored on the memory cells is detected, the LSB pages are more reliable, have a lower bit BER, than the MSB pages. Some differences in reliability of memory cells arise from effects of the memory device electronics and/or the sensitivity of certain memory cells to disturbances that arise from the order of reading and/or writing memory cells.

Embodiments discussed herein involve identifying and/or using memory cells (also referred to herein as memory locations) for certain usage in a tiered or hybrid memory device based on the reliability of the cells. The usage of the memory locations may dynamically change along with changes in reliability of the memory locations. Some embodiments involve using first memory locations of a secondary memory as a read cache to store redundant data and using second memory locations of the secondary memory as a write cache to store non-redundant data. The redundant data is also stored in the primary memory device, whereas the non-redundant data is unique in the memory device. In this configuration, redundant data can be stored in the less reliable and or slower access speed first memory locations of the secondary memory device, thus reserving the more reliable and or faster access speed second memory locations of the secondary memory device for the non-redundant data. For example, in some implementations, the first memory locations may comprise MSB pages and the second memory locations may comprise LSB pages. The more reliable LSB pages will be able to store data with a lower bit error rate (BER) over a longer period of time than the MSB pages.

Embodiments described herein involve dynamically adjusting the usage of the flash memory pages to increase reliability across the device. The dynamic adjustment may be implemented using quality metrics which are known a priori or which are obtained by the memory device controller. The quality metrics can include parameters such as bit error rate and/or access speed.

FIG. 1 is a block diagram of a system comprising a memory device 101 that includes a primary memory 110 and a secondary memory 120. In some implementations the primary memory 110 and/or the secondary memory 120 may both be nonvolatile memory. For example, the primary memory 110 may be a hard disk drive (HDD) and the secondary memory 120 may be a solid-state disk drive (SSD). In some cases, the secondary memory 120 provides read and write cache storage for the primary memory 110. The primary memory 110 and the secondary memory 120 are coupled through a controller 130 to a host 140. The controller 130 controls read and write accesses by the host 140 to the memory device 101. Secondary memory 120 includes first memory locations 121 and second memory locations 122, where in the second memory locations 122 are more reliable and/or have faster access speed than the first memory locations 121. In other words, the second memory locations 122 exhibit superior quality metrics when compared to the quality metrics of the first memory locations 121.

In some implementations the secondary memory 120 comprises multilevel memory cells capable of storing two or more bits per cell with the cells sharing the same word line. Each physical memory page of the secondary memory 120 shares the same word line and, when arranged in a multipage architecture, bits and memory cells of the physical page that have the same significance will be organized as a logical memory page. For example, in multipage architecture the MSB bits are arranged as an MSB page and the LSB bits are arranged as an LSB page. Early in the life of the device, most of the memory cells will be able to store data and retain it for an extended amount of time. However as the device ages, there will be a growing difference between the error rate of the bits in the same word line and the retention ability for each of the levels will change. The LSB pages will be able to retain data longer with a lower BER and the MSB pages will store data with a higher BER and with less retention time. When the quality metrics, e.g., access speed and/or bit error rate, of the certain pages or types pages differ from the quality metrics of other pages or types of pages, the group of pages can be used for different functions suited to the group's quality metrics.

In some embodiments, non-redundant write cache data is stored in the second memory locations which comprise LSB pages. Using the LSB pages to store non-redundant write cache data allows the more reliable pages to be used for data that is unique in the system (i.e., not stored elsewhere in the system). As previously mentioned, in general the LSB pages have lower bit error rates and longer thus higher reliability when compared with MSB pages. Thus, the LSB pages are better suited for storing data that does not exist anywhere except in the hybrid memory device except for the write cache. Additionally, the LSB pages are faster to program than the MSB pages because the iterative programming algorithm does not need to have the tight data placement that is used for the MSB pages. In this embodiment, read cache data is stored in the MSB pages. The MSB pages have higher bit error rates and lower reliability, however the lesser reliability of the MSB pages is not as important for read cache data because the read cache data is redundantly stored in the primary memory, and thus is not unique in the hybrid memory device. The retention times for the lower reliability MSB pages are still on the order of days or weeks and these retention times are sufficient for use as a read cache. With the combination of using LSB pages as write cache and using MSB pages as read cache, the capacity of the flash can be more efficiently utilized. Each type of memory cell is used in a manner that is optimal for the type of data stored in it.

In the above example, the MSB pages can be selected as the first memory locations 121 and the LSB can be selected as the second memory locations 122 a priori, i.e., before the device is used, because the difference in quality metrics, e.g. reliability and access speed, between the MSB and LSB pages is known before the quality metrics are determined. Other examples of memory locations having differing reliability characteristics which are known a priori may be present due to disturb effects that inherently affect certain memory locations more than other and/or artifacts of the electronics used to access the memory locations. For example, memory locations accessed using the first and last word lines of a block can have higher bit error rates than other memory locations of the block.

In other embodiments, the selection of the first memory locations used for the read cache and the second memory locations used for the write cache can be made in response to a posteriori determination of the quality metrics of the memory locations. For example, in some cases, quality metrics of the memory cells are determined on an ongoing basis while the memory device is in use, and the first memory locations and the second memory locations are selected in response to the measured quality metrics.

The specifications for some flash memory state that less than X percent, will fail prior to a specified number of erase/program cycles. According to these specifications, when any page within the block goes above the correctable threshold, the block is no longer used to store data. However, even when the flash memory has failed according to the above specification e.g. X% of the blocks failing, this leaves 100-X% of the blocks that are still usable to store data. Given the assumption of a normal or Poisson distribution it is evident that the usage of the flash memory can be enhanced by using the "failing" blocks to store data for which the retention time requirements are relaxed, e.g., read cache data that only needs to be stored for a relatively brief period of time and which is redundantly stored elsewhere in the memory device. According to embodiments discussed herein, as the bit error rate of the blocks increases, instead of marking the block as defective and ceasing to use them, the usage of the blocks is changed from storing relatively non-volatile and non-redundant data, such as write cache data, to storing volatile and redundant data, such as read cache data. In this context, nonvolatile data refers to data that must be stored for relatively longer period of time, and volatile data refers to data that needs to be stored for relatively shorter period of time. Using this approach, although the number of reliable pages or blocks of the flash is decreasing, the overall performance of the system may not degrade significantly. In some cases, this approach can allow for extension of the flash memory well past the reliability specification for the device.

Figure 2:
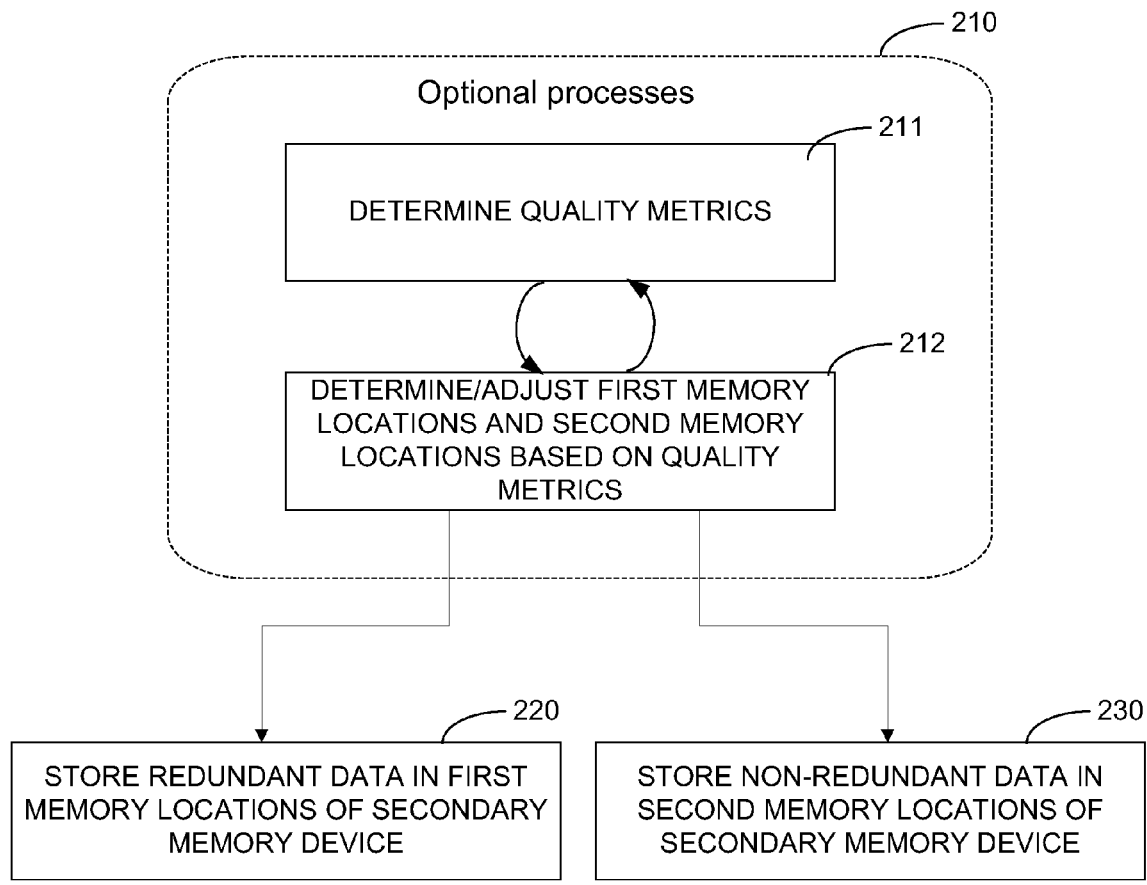
FIG. 2 is a diagram illustrating an approach illustrating optional processes to periodically or from time to time determine the quality metrics of the secondary memory.

FIG. 2 is a diagram illustrating an approach illustrating optional processes 210 to periodically or from time to time determine 211 the quality metrics of the secondary memory. The quality metrics may be used to identify and/or adjust 212 the first memory locations and the second memory locations based on the quality metrics. For example, the quality metrics may include bit error rate and/or may include a number of program cycles experienced by the memory locations and/or may include access time of the memory locations, and/or may include other memory parameters. As previously discussed, the volatile and/or redundant data is stored 220 in the less reliable first memory locations of the secondary memory device and the non-volatile and non-redundant data is stored 230 in the more reliable second memory locations of the secondary memory device.

Storing data into the pages of a block may occur so that the pages are programmed in order according to logical address. In these cases, the programming of MSB pages may be interleaved with the programming of the LSB pages, wherein the programming of one or more but less than all of the LSB pages occurs before the programming of one or more but less than all of the MSB pages. It can also be the case that all the LSB pages are programmed before all the MSB pages are programmed.

Figure 3:
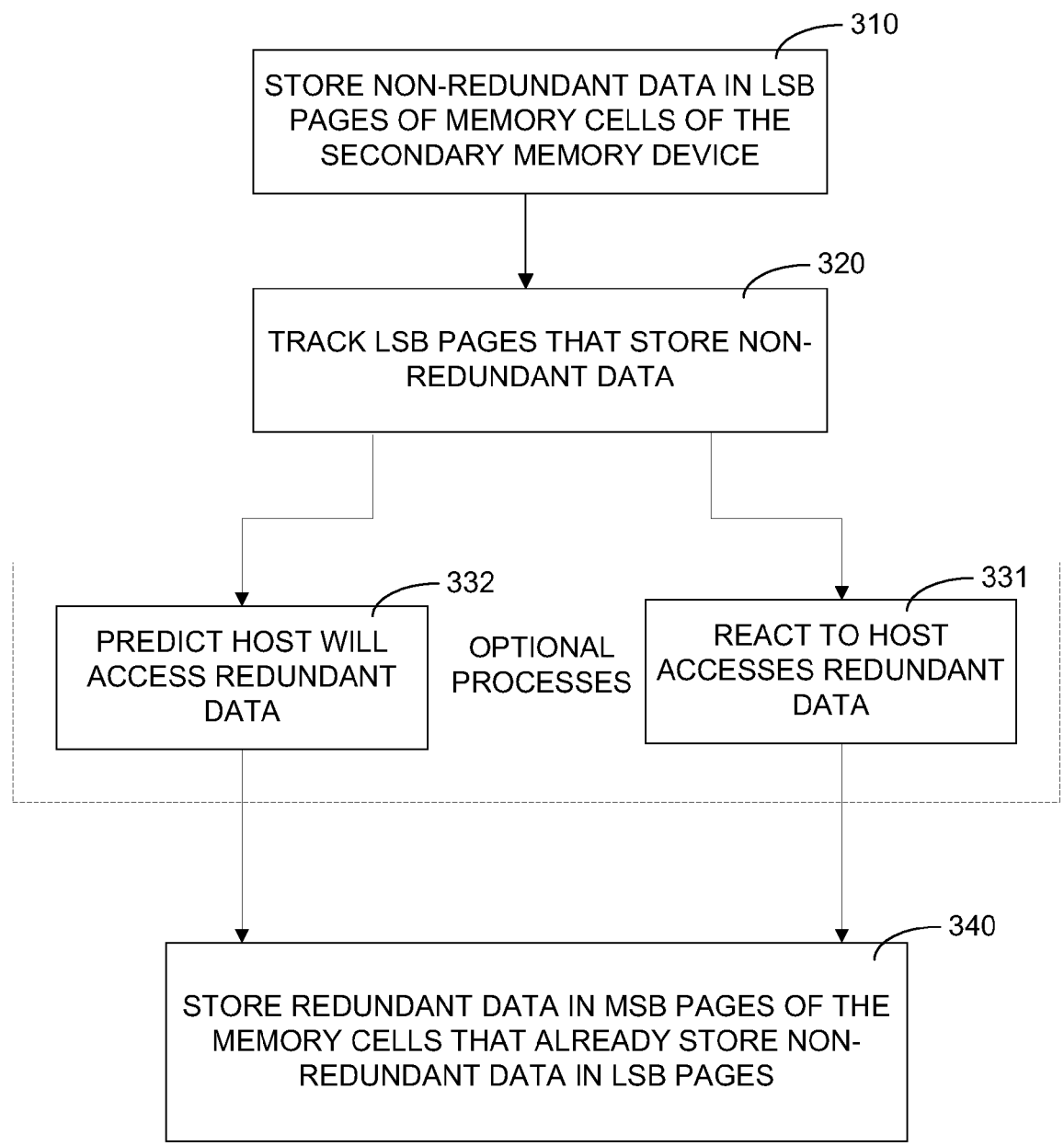
FIG. 3 illustrates tracking pages via an internal metadata system so that the pages can be used for subsequent storage of redundant read cache data.

Programming the LSB data first using a non-interleaved approach may serve to take in as much write data into the second memory locations of the secondary memory as possible in a bursty fashion. When the host system writes data to the primary memory device via the write cache, it is likely to contain a number of bursty operations. One of the aspects of a flash write cache is to absorb such bursty writes. The usage of the LSB programming operations will allow such burstiness to be absorbed by the device at optimal performance because writes to LSB pages, which generally take less than about 500 µs to complete, are significantly faster than writes to MSBs pages, which generally take about 3 ms to implement. As illustrated in FIG. 3, after the host burst of writes is stored 310 as non-redundant data in LSB pages of memory cells of the secondary memory, there may be a set of blocks which have only LSB data programmed to them. These blocks will be tracked 320 via an internal metadata system implemented by the controller of the memory device. The tracked pages which have LSB data programmed to them can be used for subsequent storage of redundant read cache data in the MSB bits. Storage of the redundant data in the MSB pages of the read cache can optionally either be reactive 331 to the host read stream, or in some cases, the storage of the redundant data can be predictive 332.

Reactive read caching 331 occurs when the host sends read requests to the primary memory via the controller and the controller responds to those read requests. Data from the primary memory is read and cached in the first memory locations of the secondary memory prior to the read data being sent to the host.

Predictive read caching 332 can occur when the controller predicts that the host will access certain data. In the predictive approach, the controller makes a determination that the host is likely to request certain data from the primary memory, for example, the prediction can be based on previous read requests from the host. The controller then causes the predicted read data to be stored in the read cache. In either the reactive or the predictive case, after the LSB pages of the block are written, at least some of the MSB pages of the cache are used to store 340 data from the primary memory and the data written in the MSB. As previously discussed the data stored in the read cache pages is redundant with data stored in the primary memory and is considered volatile and redundant for purposes of data integrity.

In some implementations, the data stored in the LSB pages will be tracked and managed to perform a write-back policy to the primary store. Note that a write-through policy is also possible, but will likely not provide as much performance advantage when compared to the write-back policy. The LSB blocks can also be tracked via the internal metadata system of the controller to be used for subsequent read cache data promotion activity as described in more detail below.

Figure 4A:
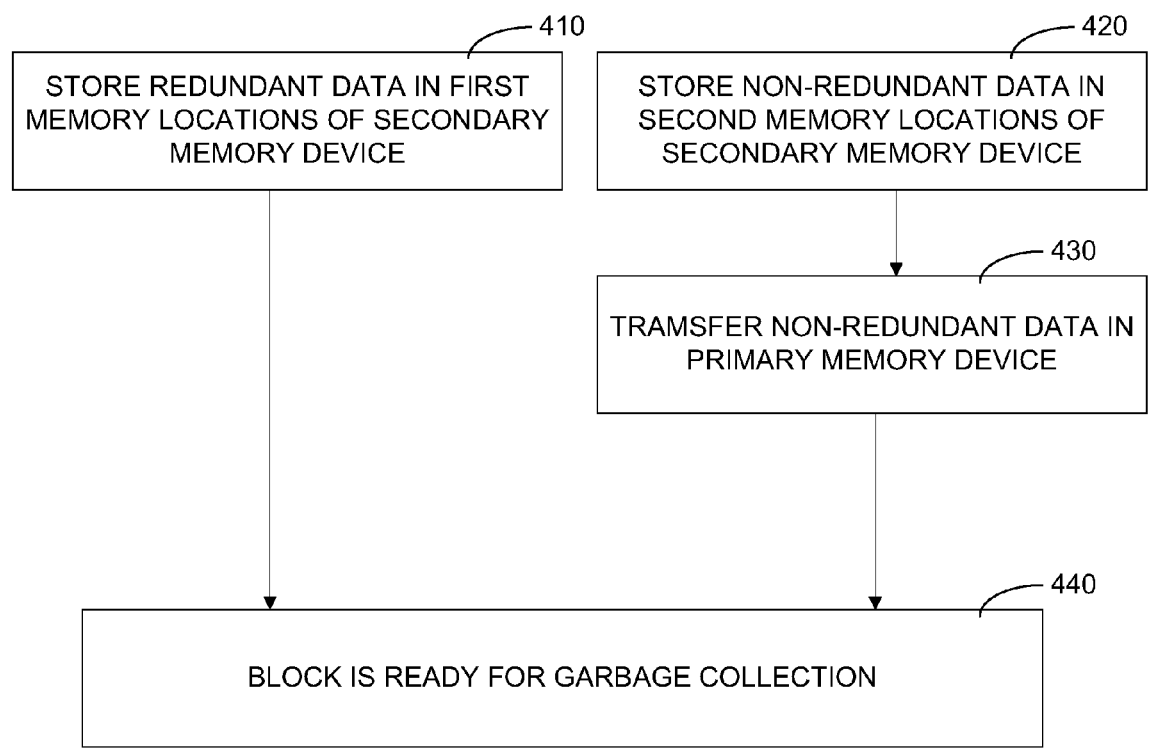
FIGS. 4A and 4B are flow diagrams that illustrate a process for storing redundant data in first memory locations and non-redundant data in second memory locations.
Figure 4B:
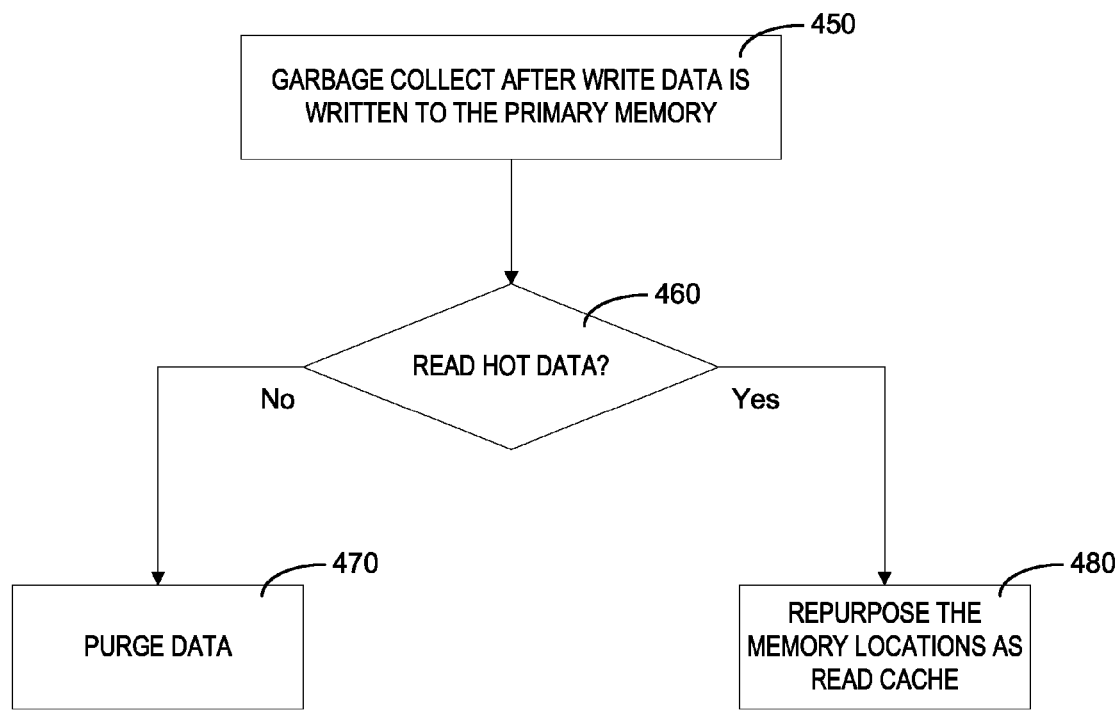

The flow diagrams of FIGS. 4A and 4B illustrate that redundant data can be stored 410 in first memory locations and non-redundant data stored 420 in second memory locations. A block is ready for garbage collection 440 after the write data is no longer "dirty" to the cache system, i.e., the data stored in the write cache of the secondary memory has been written 430 to the primary memory. When the garbage collection of the block is performed 450, the controller has the option 460 of either purging 470 all the data from the block or, alternatively, if the data is considered valuable to the system (i.e. read hot), then the data from the second memory locations of the write cache can be redesignated 480 as first memory locations of the read cache. For example, during garbage collection, if it would be beneficial to retain the data in the write cache within the secondary memory, such as the case for frequency read (read hot) data, the write cache data stored in a first set of LSB pages can be redesignated as read cache data. Retaining read hot data by redesignating the second memory locations (write cache) as the first memory locations (read cache) is a process known as "self-promotion" because data already stored in the write cache of secondary memory retained at that location and is redesignated as read cache data in the secondary memory device without having to transition through the primary memory.

Figure 5:
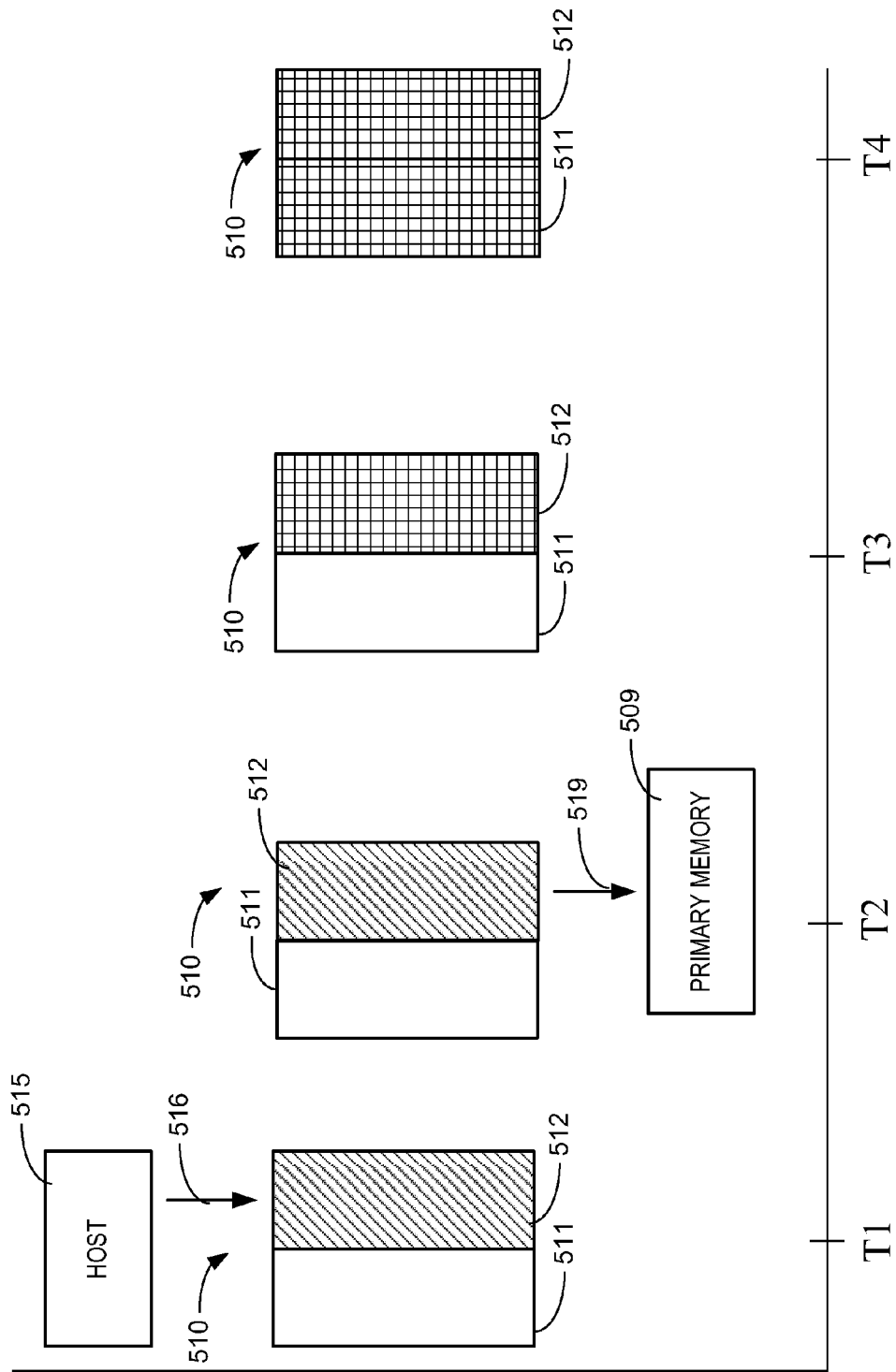
FIG. 5 diagrammatically shows an example process of self-promotion during garbage collection.

FIG. 5 diagrammatically shows an example of self-promotion. FIG. 5 shows a block 510 that includes a portion of a write cache comprising LSB pages 512 of the block 510. At time T1, the data from the host 515 to be written to primary memory is transferred in the write cache 512 as indicated by arrow 516. At a later time, T2, data from the write cache 512 is transferred to the primary memory 509 as indicated by arrow 519. The controller determines if the data stored in the write cache 512 is frequently read data. If the data stored in the write cache is frequently read, then at time T3, the LSB pages 512 of the write cache are redesignated as read cache. As illustrated at time T4, if the MSB pages 511 of block 510 are not already designated as read cache, then the MSB pages 511 may also be designated as read cache.

In some embodiments, the usage of the first memory locations, e.g., MSB pages and the second memory locations e.g. LSB pages can be dynamically adjusted based on system usage. For example, if the MSB pages are used as a read cache and the LSB pages are used as a write cache, the sizes of the read cache and the write cache can be adjusted for optimal performance, which may involve shifting the usage of some LSB pages to the read cache, for example. Optimal size of the read cache and the write cache can provide a favorable cost-benefit relationship between the garbage collection rate (re-cycling) of the read cache data space (i.e., for hot read data) and the size of the write cache. If the system is not filling the entire write cache in a single burst, and the data in the read cache is being turned quickly e.g. by re-promotions of data, then it may be helpful to decrease the size of the write cache and increase the size of the read cache. Depending on the size of the read cache data, it may be more helpful to cache a larger amount of read cache data using both first memory locations (MSB pages) and some of the LSB pages that were previously designated as write cache (second memory) locations. When an even larger capacity is needed for read caching, the controller may enable additional bits per memory cell. Although increasing the number of bits per cell decreases the reliability of the data, this may be acceptable for read caching because the retention rate of the read cache data is relatively volatile, i.e., is not required to be stored for long periods of time that would approach the data retention time limit of the flash. Furthermore, the read caching operation is less critical because the read cache data is redundant in the memory device and can be refreshed or read from the primary memory. In some implementations, enabling additional bits per cell may involve switching at least some memory cells of the secondary memory from memory cells that store two bits per cell (MSB, LSB), to memory cells that store three or more bits per cell (MSB, ISB, LSB), where both the MSB and ISB bits are used for the read cache. more bits per cell (MSB, ISB, LSB), where both the MSB and ISB bits are used for the read cache.

Figure 6:
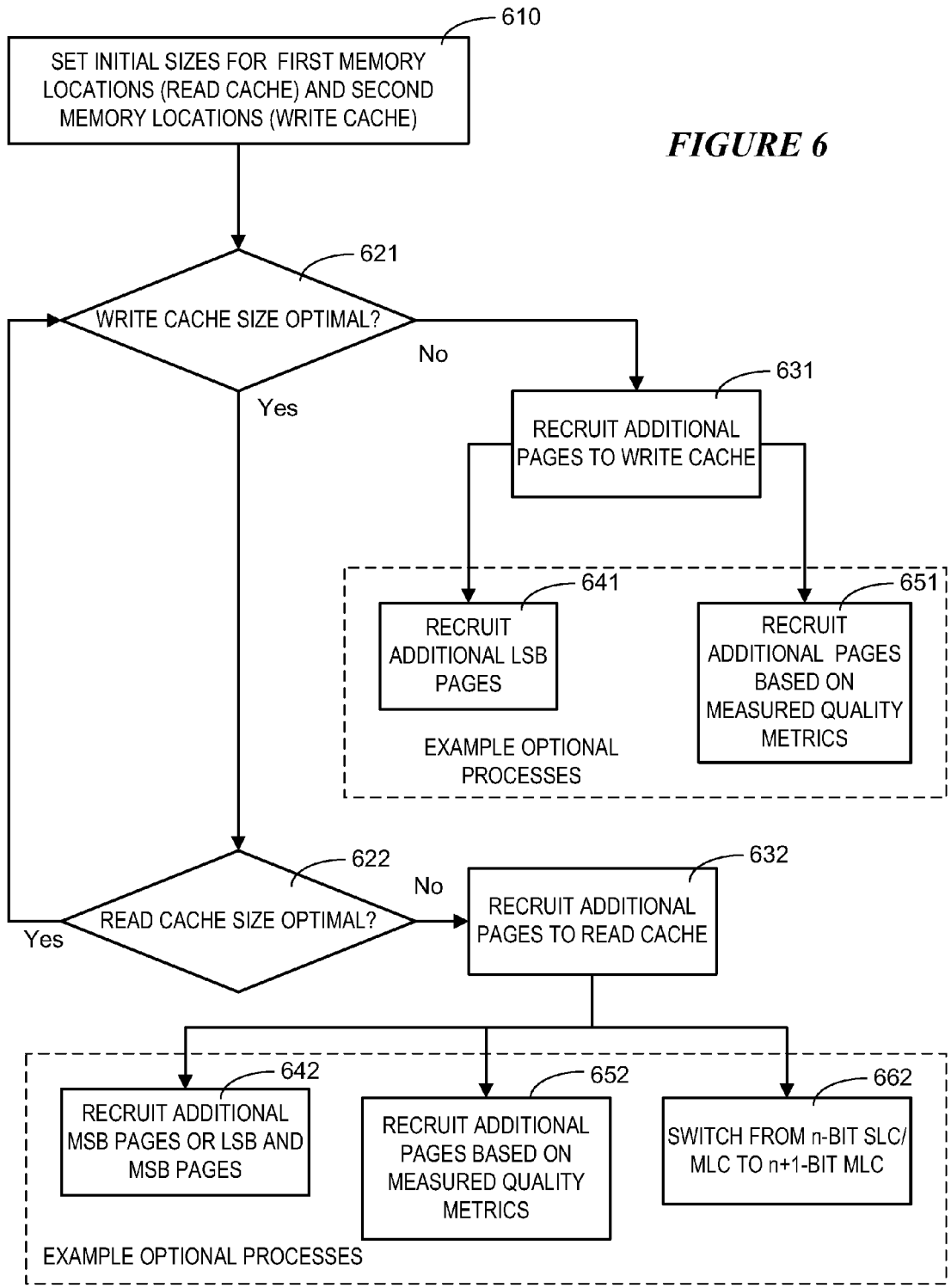
FIG. 6 is a flow diagram that illustrates dynamically sizing the read cache and/or the write cache.

FIG. 6 is a flow diagram that illustrates dynamically sizing the read cache and/or the write cache. Initial sizes for the first memory locations (read cache) and second memory locations (write cache) are initially determined 610. For example, the initial sizes may be based on default specifications or some other criteria. The controller determines if the right cache size is optimal and/or if the read cache size is optimal. Note that the read cache and the write cache can be individually re-sized to provide optimal system performance, thus block 621 622 are optional processes and only one or both of processes 621, 622 may be implemented by the controller. In some implementations, determining factors for sizing the read and/or write cache involves comparing the amount of time the primary memory is not accessed for particular workload to a threshold amount. The goal of most cache systems is to reduce or stop access to a slower or powered off system. In the example case of a hybrid drive that includes a HDD as a primary memory and a flash SSD as the secondary memory, the comparison to determine if the write cache size and/or the read cache size is optimal 621, 622 could involve comparing the length of time that the hard disk is not spinning and commands are still being serviced by the memory system to a preselected threshold.

If additional write cache space and/or read cache space is needed, the controller may recruit 631, 632 additional pages for the write cache and/or the read cache. FIG. 6 illustrates several optional processes for recruiting additional write cache pages and/or read cache pages. In some cases, the type of memory locations recruited by the controller can be based on a priori knowledge of quality metrics, for example, the controller can recruit additional LSB pages for the write cache, and/or can recruit additional MSB pages for the read cache based on a priori knowledge that these types of pages are more suited to write cache and read cache operations, respectively. In some cases, the controller can select memory locations for the read cache and or the write cache based on a posteriori knowledge. The a posteriori knowledge may come from measurement of quality metrics by the controller as discussed herein.

Recruitment of additional memory locations for the read cache can involve recruiting types of memory locations that have quality metrics which are less reliable and compatible with the more volatile read cache data. However if additional read cache capacity is needed, it is also possible that the more reliable LSB pages could be recruited for the read cache if these pages were not needed for the write cache.

Another optional process that may be implemented by the controller is to cause at least some memory cells of the secondary memory to switch 662 from memory cells that store n-bits of data to memory cells that store n+1 bits of data. For example this technique may be implemented by switching the memory cells from single level cells to two bit memory cells or three bit memory cells or may be implemented by switching the memory cells from two bit memory cells to three or more bit memory cells.

Figure 7:
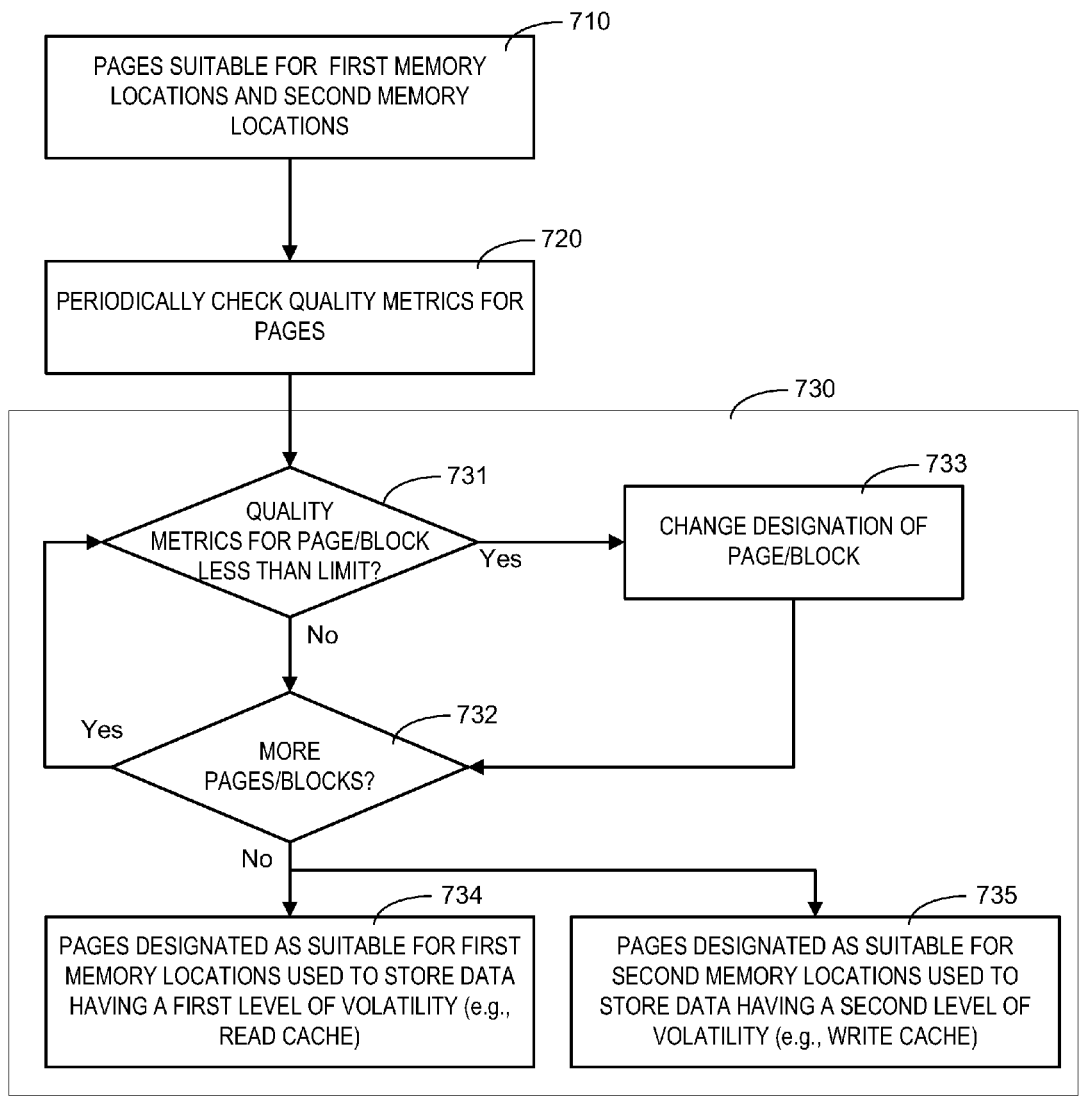
FIG. 7 is a flow diagram that illustrates a process for determining and/or adjusting the pages designated for the first memory locations (read cache) and/or the pages designated for the second memory locations (write cache) based on quality metrics.

FIG. 7 is a flow diagram that illustrates a process for determining and/or adjusting the pages designated for the first memory locations (read cache) and/or the pages designated for the second memory locations (write cache) based on quality metrics measured by the controller. In this example, it is presumed that when the device is new, the memory cells start out with relatively quality metrics, e.g., high reliability, however with increasing erase/program cycles, the quality metrics degrade. Thus, initially any of the pages in the secondary memory have reliability characteristics suitable for use 710 as the first memory locations or the second memory locations. From time-to-time, or on a periodic basis, or as data is written to and read from the pages of the first memory locations or the second memory locations, the controller determines 720 the quality metrics e.g. BER, of the pages and reallocates 730 pages to the first memory locations and the second memory locations. Although not shown in FIG. 7, in addition to real-locating the pages, the controller may also recruit additional pages for the first memory locations and/or the second memory locations. Reallocation of the pages can be based on the quality metrics of the pages or blocks. For example, in one scenario, the controller can compare 731, 732 the quality metrics of each page/block to a predetermined quality metric limit. If the reliability, e.g. BER, of a page or block degrades 731 beyond the predetermined limit, the controller may change 732 the designation of the degraded pages/blocks so that the degraded pages/blocks are no longer designated for use as the second memory locations (write cache). The controller may re-designate these degraded pages as first memory locations so that the pages can still be used for the read cache. According to this approach, a first subset of pages/blocks would be designated 734 as suitable for the first memory locations (read cache) based on the quality metrics of the pages. The first memory locations would be suitable to store data having a first level of volatility and/or redundant data, e.g. read cache data. A second subset of pages//blocks would be designated 735 as being suitable for second memory locations. These memory locations would store data having a second level of volatility where the second level of volatility is lower than the first level of volatility. The pages suitable for data having the second level of volatility could be used as the write cache. Thus the system can dynamically reallocate pages/blocks previously designated for write cache storage to being designated as read cache storage and vice versa. Such an approach is helpful because although the read cache pages/blocks may have degraded beyond the minimum specification for the second memory device, these pages/blocks are still useful as read cache storage, thus providing for optimal utilization of the secondary memory.

It is to be understood that this detailed description is illustrative only, and various additions and/or modifications may be made to these embodiments, especially in matters of structure and arrangements of parts and/or processes. Accordingly, the scope of the present disclosure should not be limited by the particular embodiments described above, but should be defined by the claims set forth below and equivalents thereof.

What is claimed is:

1. A memory system, comprising:
  a memory controller configured to
    cause redundant data that is stored in other locations of a memory system to be stored in first memory locations of a non-volatile secondary memory that serves as a cache for a non-volatile primary memory, the primary memory comprising a hard disk drive (HDD) and the secondary memory comprising a solid state memory;
    cause non-redundant data that is not stored in other locations of the memory system to be stored in second memory locations of the secondary memory, the second memory locations having at least one of lower bit error rate and higher access speed than the first memory locations; and
    dynamically determine sizes for the first and second memory locations in response to an amount of time that the HDD is spinning and commands to read from and write to the HDD are being serviced for a particular workload.

2. The memory system of claim 1, wherein the memory controller is configured to determine quality metrics of the secondary memory, the quality metrics including at least one of bit error rate and access speed, and to identify at least one of the first and second memory locations in response to the quality metrics.

3. The memory system of claim 1, wherein:
  the first memory locations comprise a read cache and the redundant data comprises read data stored in the read cache after being read from the primary memory; and
  the second memory locations comprise a write cache and the non-redundant data comprises write data stored in the write cache prior to being written to the primary memory.

4. The memory system of claim 1, wherein the controller is configured to redesignate a portion of the second memory locations as first memory locations in response to non-redundant data stored in the portions being identified as frequently accessed data.

5. The memory system of claim 1, wherein:
  the primary memory comprises a hard disk drive; and
  the secondary memory comprises a solid state memory.

6. The memory system of claim 1, wherein:
  the secondary memory comprises a multilevel solid state memory;
  the first memory locations comprise most significant bit (MSB) pages of the multilevel solid state memory; and
  the second memory locations comprise least significant bit (LSB) pages of the multilevel solid state memory.

7. The memory system of claim 6, wherein the memory controller is configured to interleave programming the MSB pages and the LSB pages of a memory block.

8. The memory system of claim 6, wherein the memory controller is configured to program all the LSB pages of a memory block before programming the MSB pages of the memory block.

9. The memory system of claim 1, wherein the controller is configured to dynamically determine sizes for the first and second memory locations in response to amounts of redundant data and non-redundant data that needs to be stored in the secondary memory.

10. The memory system of claim 9, wherein the controller is configured to determine sizes for the first and second memory locations in response to an amount of time that the primary memory is not accessed for a particular workload.

11. A memory system, comprising:
  a memory controller configured to:
    cause redundant data that is stored in other locations of a memory system to be stored in first memory locations of a non-volatile secondary memory that serves as a cache for a non-volatile primary memory;
    cause non-redundant data that is not stored in other locations of the memory system to be stored in second memory locations of the secondary memory, the second memory locations having at least one of lower bit error rate and higher access speed than the first memory locations; and
    change a number of bits stored in each memory cell of the secondary memory in response to an amount of redundant data that needs to be stored in the first memory location.

12. A method, comprising:
  causing redundant data that is stored in a primary memory of a memory device to be stored in first memory locations of a secondary memory of the memory device, the primary memory comprising a hard disk drive (HDD) and the secondary memory comprising a solid state memory;
  causing non-redundant data that is not stored in the primary memory of the memory device to be stored in second memory locations of the secondary memory of the memory device, wherein the second memory locations have at least one of a lower bit error rate and higher access speed than the first memory locations; and
  dynamically determining sizes for the first and second memory locations in response to an amount of time that the HDD is spinning and commands to read from and write to the HDD are being serviced for a particular workload.

13. The method of claim 12, wherein:
  the first memory locations are a read cache of the memory device; and
  the second memory locations are a write cache of the memory device.

14. The method of claim 13, further comprising:
  determining quality metrics of the secondary memory, the quality metrics including at least bit error rate; and
  adjusting a size of at least one of the read cache and the write cache in response to the quality metrics.

15. The method of claim 12, wherein the first memory locations are used as a read cache and the second memory locations are used as a write cache and further comprising redesignating a portion of the write cache as the read cache in response to non-redundant data stored in the portions of the write cache being identified as frequently accessed read data.

16. The method of claim 12, wherein storing the redundant data and storing the non-redundant data comprises storing the non-redundant data in the second memory locations of a memory block before storing the redundant data in the first memory locations of the memory block.

17. The method of claim 12, wherein storing the redundant data and storing the non-redundant data comprises interleaving the storing of the non-redundant data in the second memory locations of a memory block with the storing of the redundant data in the first memory locations of the memory block.

18. The method of claim 12, further comprising determining optimal sizes for the first memory locations and the second memory locations based on an amount of time that the primary memory device is not accessed for a particular workload.

19. The method of claim 12, further comprising changing a number of bits stored in memory cells of the secondary memory in response to an amount of the redundant data that needs to be stored in the first memory locations.

* * * * *